United States Patent
Logan, Jr. et al.

(10) Patent No.: US 8,798,405 B2
(45) Date of Patent: Aug. 5, 2014

(54) METHOD OF MAKING A FIBER OPTIC GYROSCOPE

(75) Inventors: Ronald T. Logan, Jr., Pasadena, CA (US); Ka Kha Wong, Alhambra, CA (US)

(73) Assignee: Emcore Corporation, Albuquerque, NM (US)

( * ) Notice: Subject to any disclaimer, the term of this patent is extended or adjusted under 35 U.S.C. 154(b) by 134 days.

(21) Appl. No.: 13/198,488

(22) Filed: Aug. 4, 2011

(65) Prior Publication Data

US 2013/0033737 A1 Feb. 7, 2013

(51) Int. Cl.
*G01C 19/72* (2006.01)
*G01C 19/64* (2006.01)
*G02B 6/32* (2006.01)
*G02B 6/30* (2006.01)

(52) U.S. Cl.
CPC .............. *G01C 19/64* (2013.01); *G02B 6/327* (2013.01); *G01C 19/722* (2013.01); *G01C 19/72* (2013.01); *G02B 6/30* (2013.01)
USPC .............................................. 385/1; 356/460

(58) Field of Classification Search
CPC .. G01C 19/721; G01C 19/722; G01C 19/726; G01C 19/64
USPC .............................................. 385/1; 356/460
See application file for complete search history.

(56) References Cited

U.S. PATENT DOCUMENTS

| | | | |
|---|---|---|---|
| 5,677,767 A | 10/1997 | Shirasaki et al. | |
| 6,034,924 A | 3/2000 | Vakoc | |
| 6,278,657 B1 | 8/2001 | Vakoc | |
| 6,351,310 B1* | 2/2002 | Emge et al. | 356/460 |
| 6,377,391 B1 | 4/2002 | Vakoc et al. | |
| 6,466,364 B1 | 10/2002 | Vakoc et al. | |
| 6,529,444 B2 | 3/2003 | Vakoc | |
| 6,667,935 B2 | 12/2003 | Vakoc | |
| 6,678,211 B2 | 1/2004 | Vakoc | |
| 7,746,476 B2 | 6/2010 | Demers et al. | |
| 2002/0097636 A1 | 7/2002 | Vakoc | |
| 2002/0145795 A1 | 10/2002 | Vakoc et al. | |
| 2003/0043696 A1 | 3/2003 | Vakoc | |
| 2003/0043697 A1 | 3/2003 | Vakoc | |
| 2003/0123064 A1* | 7/2003 | Szafraniec et al. | 356/460 |
| 2007/0030491 A1* | 2/2007 | Ohno et al. | 356/460 |
| 2007/0097374 A1* | 5/2007 | Ren-Young | 356/460 |
| 2010/0220332 A1* | 9/2010 | Digonnet | 356/465 |
| 2010/0301352 A1* | 12/2010 | Strandjord et al. | 257/84 |

* cited by examiner

*Primary Examiner* — Charlie Peng
*Assistant Examiner* — Mary El Shammaa

(57) ABSTRACT

Methods of attaching an optical line to a phase modulator in a fiber optic gyroscope. The methods include positioning at least one end of the optical line relative to a side of the phase modulator. The end of the optical line may have a first non-perpendicular angle and the side of the phase modulator may have a second non-perpendicular angle. The end of the optical line may be attached to the side of the phase modulator with the end of the optical line being non-parallel to the side of the phase modulator. The optical line may be an optical coil or a light path.

18 Claims, 5 Drawing Sheets

METHOD OF MAKING A FIBER OPTIC GYROSCOPE

BACKGROUND

The present application relates to a fiber optic gyroscope (FOG) and, in particular, to methods of making a spliceless FOG.

A FOG is a device that uses the propagation of light beams in an optical coil to detect mechanical rotation of the optical coil. The sensor is a coil with a length of as much as 5 km. The typical implementation provides that two light beams be launched into the optical coil in opposite directions. Due to an optical phenomenon known as the Sagnac effect, the beam traveling against the rotation experiences a slightly shorter path than the other beam resulting in a relative phase shift. The amount of the phase shift of the original two beams can be measured by determining how the beams interfere with each other when they are combined. The intensity of the combined beam then depends on the rotation rate of the fiber coil about its axis.

A FOG provides extremely precise rotational rate information, in view of its lack of cross-axis sensitivity to vibration, acceleration, and shock. Unlike the classic spinning-mass gyroscope, the FOG has virtually no moving parts and no inertial resistance to movement. The FOG also can provide higher resolution than a ring laser gyroscope and is utilized in inertial navigation systems requiring a very high degree of accuracy.

SUMMARY OF THE INVENTION

The present application is directed to methods of making a fiber optic gyroscope. One method includes positioning an optical line in proximity to a phase modulator. The optical line has an exposed end with a planar face aligned at a first non-perpendicular angle and the phase modulator has a side aligned at a second non-perpendicular angle with the first and second angles being different. The method includes aligning the end of the optical line with an optical waveguide in the side of the phase modulator. The method also includes attaching the end of the optical line to the side of the phase modulator with the end of the optical coil being non-parallel to the side of the phase modulator.

Another method of making a fiber optic gyroscope includes cleaving an optical line and creating an exposed planar end aligned at a first non-perpendicular angle. The method includes aligning the end of the optical line with an optical waveguide that is exposed on a side of a phase modulator. The side of the phase modulator is aligned at a second non-perpendicular angle different than the first angle. The method also includes attaching the end of the optical line to the side of the phase modulator with the end of the optical line being non-parallel with the side of the phase modulator.

Another method of making a fiber optic gyroscope includes aligning first and second ends of an optical coil with optical waveguides that are exposed on a first side of a phase modulator. The method includes attaching the ends of the optical coil to the first side of the phase modulator with the ends of the optical coil being non-parallel with the first side of the phase modulator. The method includes aligning an end of a light path with an optical waveguide that is exposed on a second side of the phase modulator. The method also includes attaching the end of the light path to the second side of the phase modulator with the end of the light path being non-parallel with the second side of the phase modulator.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility. Some implementations of the present invention may incorporate or implement fewer of the aspects and features noted in the foregoing summaries.

BRIEF DESCRIPTION OF THE DRAWINGS

These and other features and advantages of this invention will be better understood and more fully appreciated by reference to the following detailed description when considered in conjunction with the accompanying drawings wherein.

Figure 1:
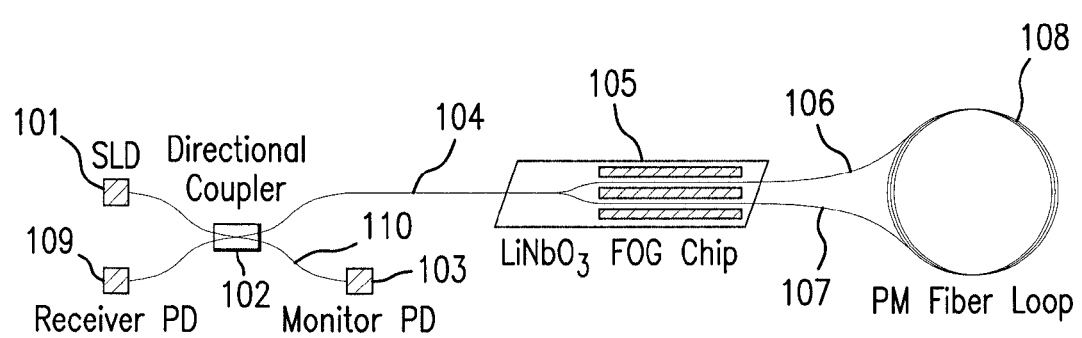
FIG. 1 is a highly simplified block diagram of a prior art single-axis fiber optic gyroscope.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

FIG. 1 depicts a highly simplified diagram of a single-axis fiber optic gyroscope (FOG) transceiver subassembly. The diagram shows a fiber-coupled broadband source, e.g. a super luminescent diode (SLD) 101 for producing a non-coherent beam of light, and a directional coupler 102 in the path of the beam. A lithium niobate (LiNbO$_3$) phase modulator or FOG chip 105 is provided in a light path 104 from the output of the directional coupler, and a power monitoring photodiode 103 is provided in a second path 110 from the output of the directional coupler. An optical coil 108 has first 106 and second 107 ends coupled to the output of the phase modulator 105.

Light from the SLD 101 is split in the Y-junction of the phase modulator 105 and each path through the phase modulator 105 is modulated before being applied to the first 106 and second 107 ends of the optical coil 108 and counter-propagated through the coil. The optical signals then pass back through the phase modulator 105, are recombined in the Y-junction in the phase modulator 105 and propagate back along light path 104 to the directional coupler 102, whereby the return optical beam is then focused onto a receiving photodiode 109 where the intensity produces an electrical signal. The electrical signal is processed externally of the transceiver subassembly to compute the rotation rate of the optical coil 108 to provide inertial guidance information.

Figure 2:
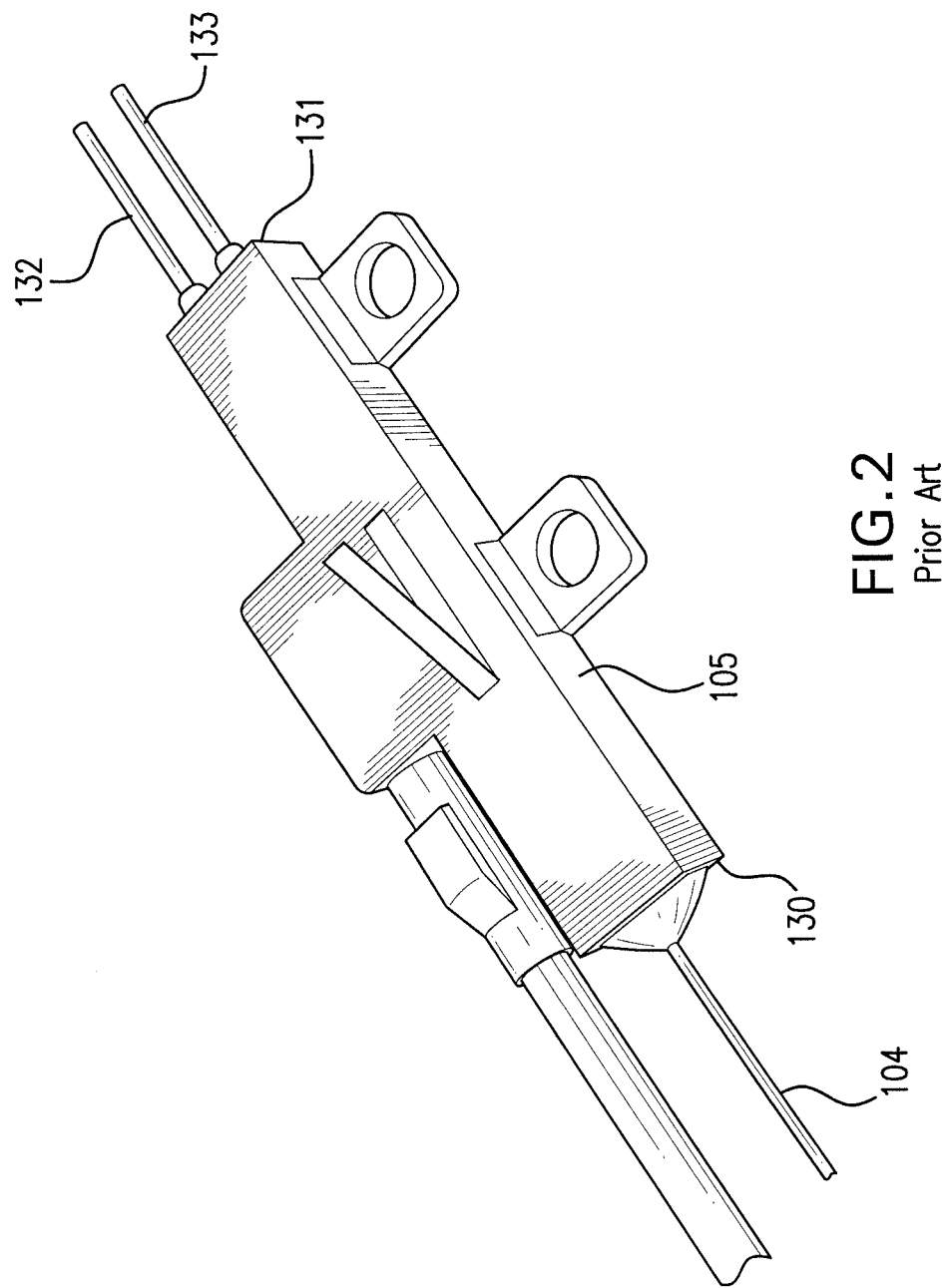
FIG. 2 is a perspective view of a prior art phase modulator with pigtails for attachment of an optical coil according to one embodiment.

FIG. 2 illustrates a perspective view of a prior art phase modulator 105 having a body with a first side 130 and an opposing second side 131. A pair of pigtails 132, 133 extends outward from the second side 131. The pigtails 132, 133 are positioned to be spliced to the optical coil 108. The light path 104 extends outward from the first side 130 of the phase modulator 105.

Figure 3:
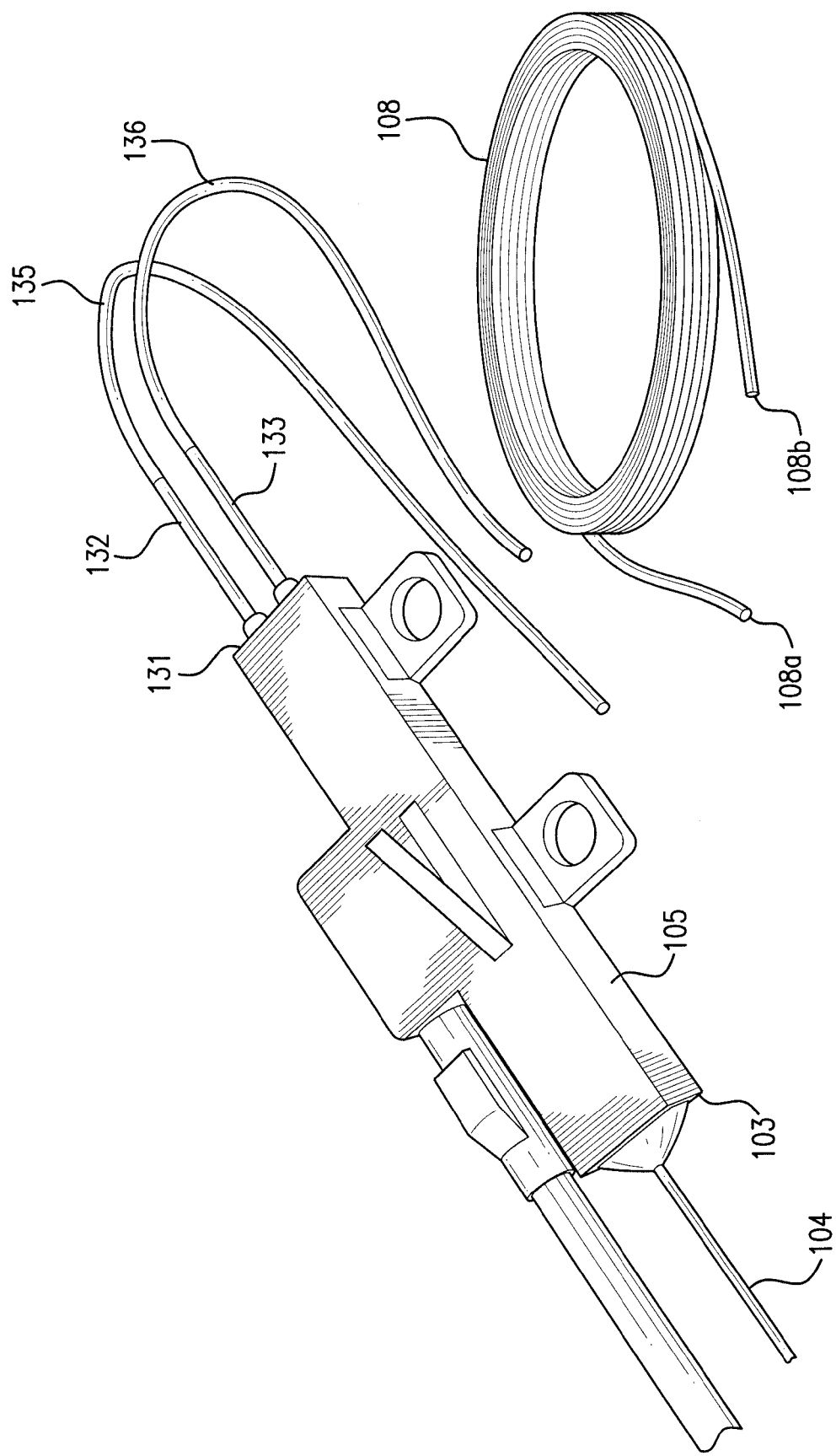
FIG. 3 is a perspective view of a prior art phase modulator with pigtails and a detached optical coil according to one embodiment.

FIG. 3 illustrates a broader view that further includes the optical coil 108 that is spliced onto the pigtails 132, 133. In this embodiment, intermediate sections 135, 136 extend outward from the pigtails 132, 133 respectively. The intermediate sections 135, 136 may be spliced to the corresponding pigtail, or may be part of the pigtails 132, 133 (i.e., the pigtails 132, 133 have an extended length). Intermediate section 135 includes an end that is spliced to a first end of the optical coil 108, and intermediate section 136 includes an end that is spliced to a second end of the optical coil 108.

Splicing the optical coil 108 to the pigtails 132, 133, 134 have various drawbacks, including but not limited to potentially introducing polarization errors and an overall decrease in reliability. Further, splicing adds time and costs to the manufacturing and assembly of the FOG.

The present invention includes splicelessly attaching at least one of the ends of the optical lines to the phase modulator 105. The ends of the optical lines include the end of the light path 104 and the ends of the optical coil 108. In one embodiment, each of the ends is splicelessly attached to the phase modulator 105 (i.e., both ends of the coil 108 and the light path 104). Another embodiment includes just the ends of the coil 108 being splicelessly attached to the phase modulator 105. The invention may also include just the light path 104 being splicelessly attached to the phase modulator 105. Further, a single end of the coil 108 may be splicelessly attached to the phase modulator 105.

Figure 4:
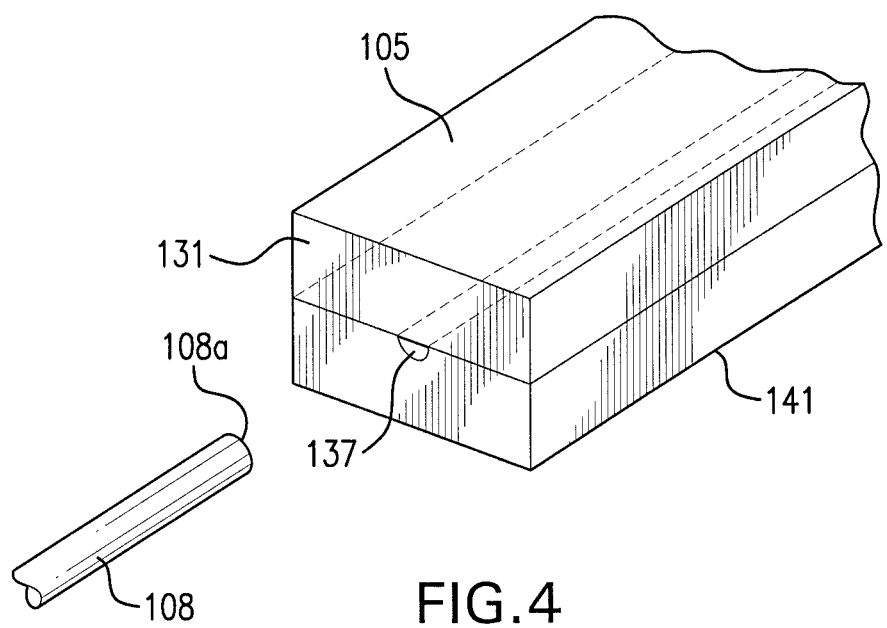
FIG. 4 is a simplified partial perspective view of a first end of an optical coil and a side of a phase modulator.
Figure 5:
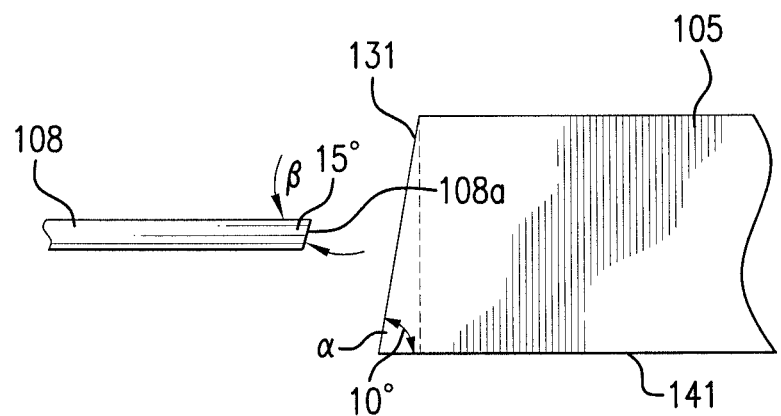
FIG. 5 is a simplified side view of the first end of the optical coil in proximity to the side of the phase modulator.
Figure 6:
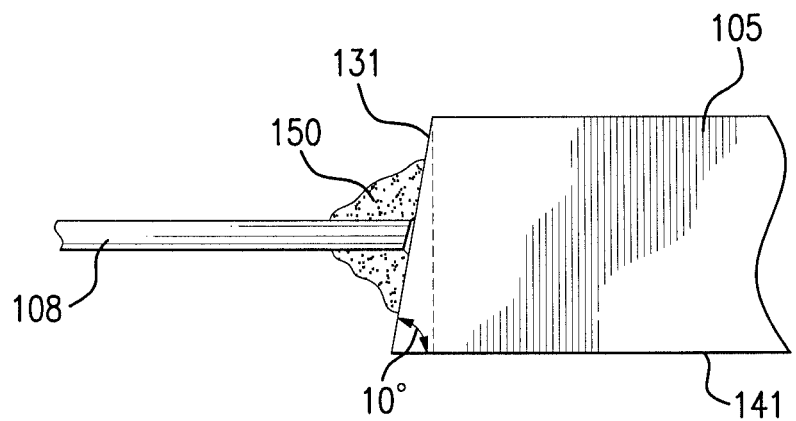
FIG. 6 is a simplified side view of the first end of the optical coil splicelessly attached to the side of the phase modulator.

For simplicity, FIGS. 4, 5, and 6 include attachment of one end of the optical coil 108 (specifically, end 108*a*) to the phase modulator 105. It should be understood that the process is also the same for splicelessly attaching the second end 108*b* of the optical coil 108 to the phase modulator 105 and the end of the light path 104 to the phase modulator 105.

The optical coil 108 has an extended length to provide the necessary accuracy for the FOG. In one embodiment, the optical coil 108 may be 200 meters in length, in which case the FOG may be considered a low accuracy model. In another embodiment, the optical coil 108 may be 500 to 1000 meters in length, in which case the FOG may be considered a medium accuracy model. In another embodiment, the optical coil 108 may be over 2 kilometers in length, in which case the FOG may be considered a high accuracy model.

As illustrated in FIG. 4, the end 108*a* of the optical coil 108 is aligned with the optical waveguide 137 exposed on the side 131 of the phase modulator 105. The end 108*a* of the optical coil 108 is cleaved such that the end 108*a* includes a planar face positioned at a non-perpendicular angle relative to a centerline of the coil 108. As illustrated in FIG. 5, the end 108*a* forms an angle β with a side of the optical coil 108. In one embodiment, the angle β is about 15°. In another embodiment, the angle β is about 10°.

The side 131 of the optical modulator 105 also includes an angled planar face. The side 131 forms an angle α with an adjacent side 141 of the phase modulator 105. In one embodiment, the angle α is about 10°. In another embodiment, the angle α is about 15°.

The angle α is different than the angle β. This positions the exposed end 108*a* of the optical coil 108 in a non-parallel orientation relative to the side 131 of the phase modulator 105. In one embodiment, the difference in angles is about 5°.

The exposed end 108*a* is aligned with the optical waveguide 137 in the phase modulator 105. An adhesive 150 is applied to attach the exposed end 108*a* to the side 131 of the phase modulator 105. The adhesive 150 is positioned such that it is away from the interface of the exposed end 108*a* and the side 131 (i.e., the adhesive 150 is not directly between the end 108*a* and the optical waveguide 137). Various types of adhesives 150 may be used to attach the end 108*a* to the phase modulator 105. One example 150 is Dymax UV-curable adhesive (P/N:OP-4-20632). Another example is LCA-49/B5 low expansion adhesive available from Bacon Industries.

The same process may also be used to attach the second end 108*b* of the optical coil 108 to the phase modulator 105. The second end 108*b* is likewise cleaved at an angle for attachment to the angled side 131. Each of the ends 108*a*, 108*b* of the optical coil 108 may have the same angle β or may have different angles β. The angles α, β are different as described above. Further, adhesive 150 is applied to attach the second end 108*b* of the coil 108 to the side 131.

Likewise, the same process may also be used to attach the end of the light path 104 to the first side 130 of the phase modulator 105. The light path 104 is cleaved to form a planar face with an angled end that is attached to the side 130 of the phase modulator 105 as described above. Specifically, the light path 104 is cleaved such that the end includes a planar face positioned at a non-perpendicular angle relative to a centerline of the line. The end of the light path 104 may include an angle of about 15° or an angle of about 10°. The side 130 of the optical modulator 105 also includes a planar face that is angled relative to the adjacent side 141. In one embodiment, the angle is about 10°. In another embodiment, the angle is about 15°.

The angle of the exposed end of the light path 104 is different than the angle of the side 130. This positions the end of the light path 104 in a non-parallel orientation relative to the side 130 of the phase modulator 105. The exposed end of the light path 104 is aligned with the optical waveguide on the side 130 of the phase modulator 105. Adhesive 150 is applied to attach the exposed end to the side 130 of the phase modulator 105. The adhesive 150 is positioned such that it is away from the interface of the exposed end of the light path 104 and the side 130.

Figure 7:
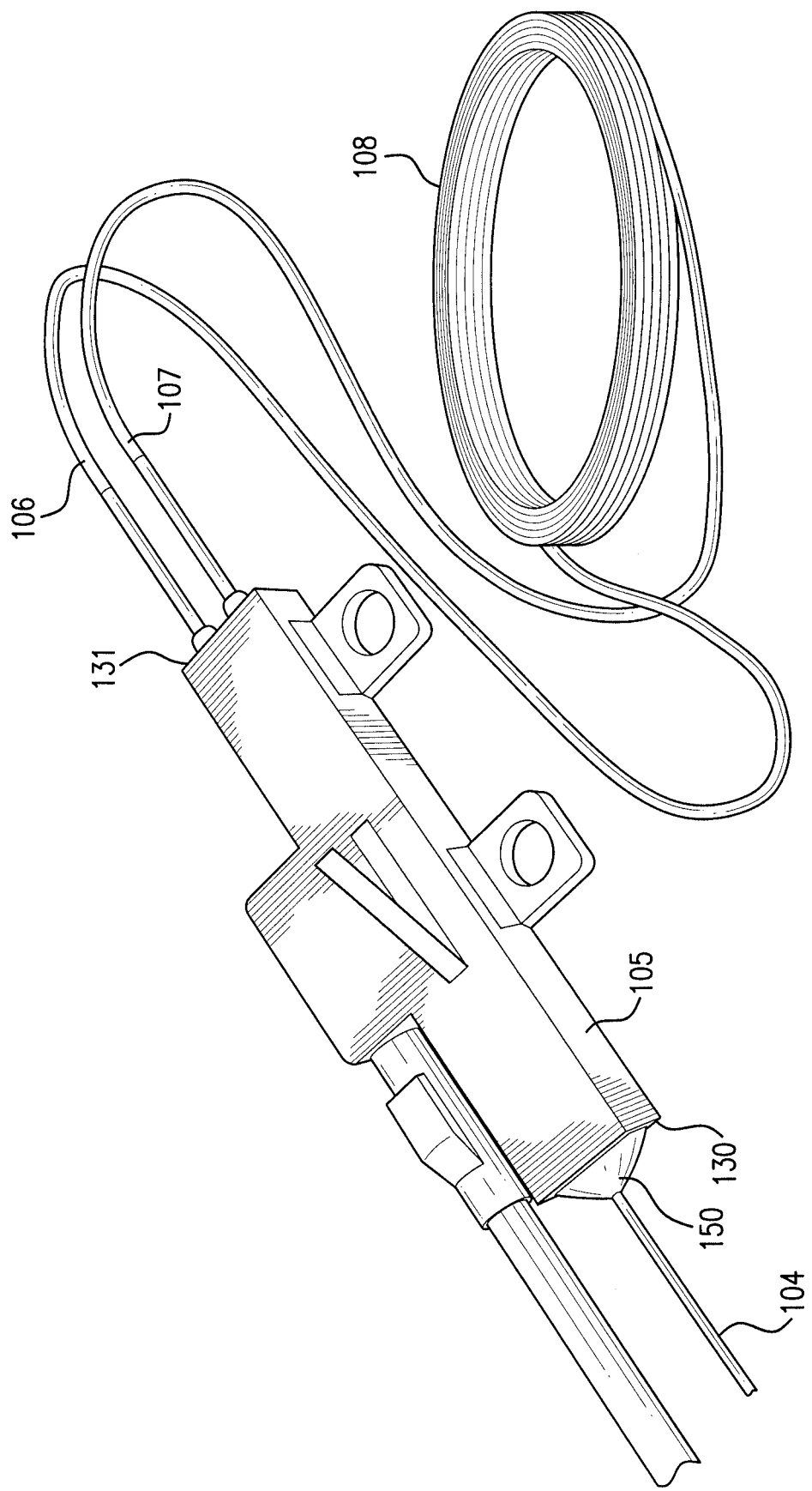
FIG. 7 is a perspective view of the optical coil splicelessly attached to the phase modulator.

FIG. 7 illustrates the optical coil 108 and the light path 104 each splicelessly attached to the phase modulator 105. Each of the ends 108*a*, 108*b* of the optical coil 108 have been attached to the side 131 of the phase modulator 105, and the end of the light path 104 is attached to the side 130 as described above.

Splicelessly connecting one or more ends of the optical lines (i.e., the light path 104 and the coil 108) to the phase modulator 105 provides for enhanced performance of the FOG. The spliceless connection prevents polarization error and reliability limitations.

While the present disclosure illustrates and describes a fiber optic gyroscope, it is not intended to be limited to the details shown, since various modifications and structural changes may be made without departing in any way from the spirit of the present disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The foregoing described embodiments depict different components contained within, or connected with, different other components. It is to be understood that such depicted arrangements or architectures are merely exemplary, and that in fact many other arrangements or architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of specific structures, architectures or intermedial components. Likewise, any two components so associated can also be viewed as being "operably connected" or "operably coupled" to each other to achieve the desired functionality.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting.

Without further analysis, from the foregoing others can, by applying current knowledge, readily adapt the disclosed technology for various applications. Such adaptations should and are intended to be comprehended within the meaning and range of equivalence of the following claims.

What is claimed is:

1. A method of making a fiber optic gyroscope comprising:
positioning a continuous optical fiber coil defining an axis in proximity to a phase modulator semiconductor device, the continuous optical fiber coil extending along a fiber centerline from a first exposed end with a planar face aligned at a first non-perpendicular angle relative to the fiber centerline to a second exposed end, wherein the continuous optical fiber is spliceless between the first exposed end and the second exposed end, wherein the phase modulator semiconductor device defines a side surface aligned at a second non-perpendicular angle relative to the fiber centerline, the first and second angles being different;
aligning the first end of the continuous optical fiber coil with an optical waveguide in the side surface of the phase modulator semiconductor device;
attaching the first end of the continuous optical fiber coil to the side surface of the phase modulator semiconductor device with the planar face of the first end of the continuous optical fiber coil being non-parallel to the side surface of the phase modulator semiconductor device;
providing a non-coherent light source configured to provide a non-coherent beam of light; and
optically coupling a directional coupler to the non-coherent light source and to the phase modulator semiconductor device, wherein the directional coupler is configured to direct at least a portion of the non-coherent light beam from the non-coherent light source to a power monitoring photodiode and at least a portion of the non-coherent light beam from the non-coherent light source to the phase modulator semiconductor device, wherein the directional coupler is further configured to direct at least a portion of light from the phase modulator semiconductor device to a receiving photodiode to produce an electrical signal for use in computation of a rotational rate of the continuous optical fiber coil about its axis.

2. The method of claim 1, wherein the continuous optical fiber coil has a length of at least 200 meters.

3. The method of claim 1, wherein the first angle is greater than the second angle.

4. The method of claim 1, wherein attaching the first end of the continuous optical fiber coil to the side surface of the phase modulator semiconductor device includes applying an adhesive over the first end of the continuous optical fiber coil and the side surface.

5. The method of claim 4, further comprising preventing the adhesive from being positioned directly between the planar face of the first end of the continuous optical fiber coil and the optical waveguide of the phase modulator semiconductor device.

6. The method of claim 1, wherein the method further comprises attaching the second end of the continuous optical fiber coil that has a non-perpendicular angle relative to the fiber centerline different than the second non-perpendicular angle to the side surface of the phase modulator semiconductor device.

7. The method of claim 1, wherein optically coupling the directional coupler to the phase modulator semiconductor device comprises attaching a first end of a source optical fiber to an opposing side surface of the phase modulator semiconductor device, wherein the source optical fiber extends along a source fiber centerline from the first end that defines a planar face aligned at a third non-perpendicular angle relative to the source fiber centerline to a second end that is optically coupled to the directional coupler, wherein the planar face of the first end of the source optical fiber is non-parallel to the second side surface of the phase modulator semiconductor device.

8. A method of making a fiber optic gyroscope comprising:
aligning first and second ends of a continuous optical fiber coil with optical waveguides that are exposed on a first side surface of a phase modulator semiconductor device, wherein the continuous optical fiber continuously extends from the first end to the second end and defines an axis;
attaching the ends of the continuous optical fiber coil to the first side surface of the phase modulator semiconductor device with the ends of the continuous optical fiber coil, wherein the first and second ends define first and second planar faces, respectively, each of the first and second planar faces being non-parallel with the first side surface of the phase modulator semiconductor device;
aligning an end of a source optical fiber with an optical waveguide that is exposed on a second side surface of the phase modulator semiconductor device, wherein the end of the source optical fiber defines a planar face;
attaching the end of the source optical fiber to the second side surface of the phase modulator semiconductor device with the planar face of the end of the source optical fiber being non-parallel with the second side surface of the phase modulator semiconductor device;
providing a non-coherent light source configured to provide a non-coherent beam of light; and
optically coupling a directional coupler to the non-coherent light source and to the phase modulator semiconductor device, wherein the directional coupler is configured to direct at least a portion of the non-coherent light beam from the non-coherent light source to a power monitoring photodiode and at least a portion of the non-coherent light beam from the non-coherent light source to the phase modulator semiconductor device, wherein the directional coupler is further configured to direct at least a portion of non-coherent light from the phase modulator semiconductor device to a receiving photodiode to produce an electrical signal to compute a rotational rate of the continuous optical fiber coil about its axis.

9. The method of claim 8, wherein the continuous optical fiber coil extends along a fiber centerline, the method further comprising cleaving the first and second ends of the continuous optical fiber coil such that the first and second planar faces are aligned at non-perpendicular angles relative to the fiber centerline.

10. The method of claim 9, wherein cleaving the first and second ends of the continuous optical fiber coil includes cleaving the first end at the same angle relative to the fiber centerline as the second end.

11. The method of claim 8, wherein the optical fiber coil includes a length measured between the first and second ends of at least 200 meters.

12. A fiber optic gyroscope comprising:
a non-coherent light source configured to provide a non-coherent beam of light;
a directional coupler to the non-coherent light source for receiving the non-coherent beam of light;
a phase modulator semiconductor device optically coupled to the directional coupler for receiving at least a portion of the non-coherent beam of light and for transmitting light thereto, wherein the phase modulator defines at least one planar side surface; and
an optical fiber coil continuously extending from a first exposed end to a second exposed end along a fiber centerline and defining an axis, wherein the optical fiber coil is spliceless from the first exposed end to the second exposed end, wherein each of the first and second exposed ends defines a planar face aligned at a first non-perpendicular angle relative to the fiber centerline, wherein each of the of the first and second exposed ends of the optical fiber coil are attached to the at least one planar side surface of the phase modulator, wherein the at least one side surface is aligned at a second non-perpendicular angle relative to the fiber centerline.

13. The fiber optic gyroscope of claim 12, wherein the optical fiber coil defines length from the first exposed end to the second exposed end of at least 200 meters.

14. The fiber optic gyroscope of claim 12, wherein the first and second angles are different, and wherein each planar face of the first and second exposed ends of the optical fiber coil is non-parallel to the side surface of the phase modulator semiconductor device.

15. The fiber optic gyroscope of claim 12, wherein the first angle is greater than the second angle.

16. The fiber optic gyroscope of claim 12, further comprising an adhesive located over a portion of the optical fiber coil proximate the first and second exposed ends and the side surface of the phase modulator semiconductor device.

17. The fiber optic gyroscope of claim 16, wherein the adhesive is not located directly between the planar face of each of the first and second exposed ends of the optical fiber coil and the side surface of the phase modulator semiconductor device.

18. The fiber optic gyroscope of claim 12 further comprising:
a power monitoring photodiode, wherein the directional coupler is configured to direct at least a first portion of the non-coherent beam of light to the power monitoring photodiode, wherein the directional coupler is configured to direct at least a second portion of the non-coherent beam of light to the phase modulator semiconductor device;
a receiving photodiode to receive light and to produce an electrical signal based on the received light to compute a rotational rate of the continuous optical fiber coil about its axis, wherein the directional coupler is configured to direct at least of portion of light from the phase modulator to the receiving photodiode.

* * * * *